Sept. 20, 1938.  E. E. HEWITT  2,130,621
MAGNETIC BRAKE CONTROL
Filed Jan. 13, 1937  3 Sheets-Sheet 1
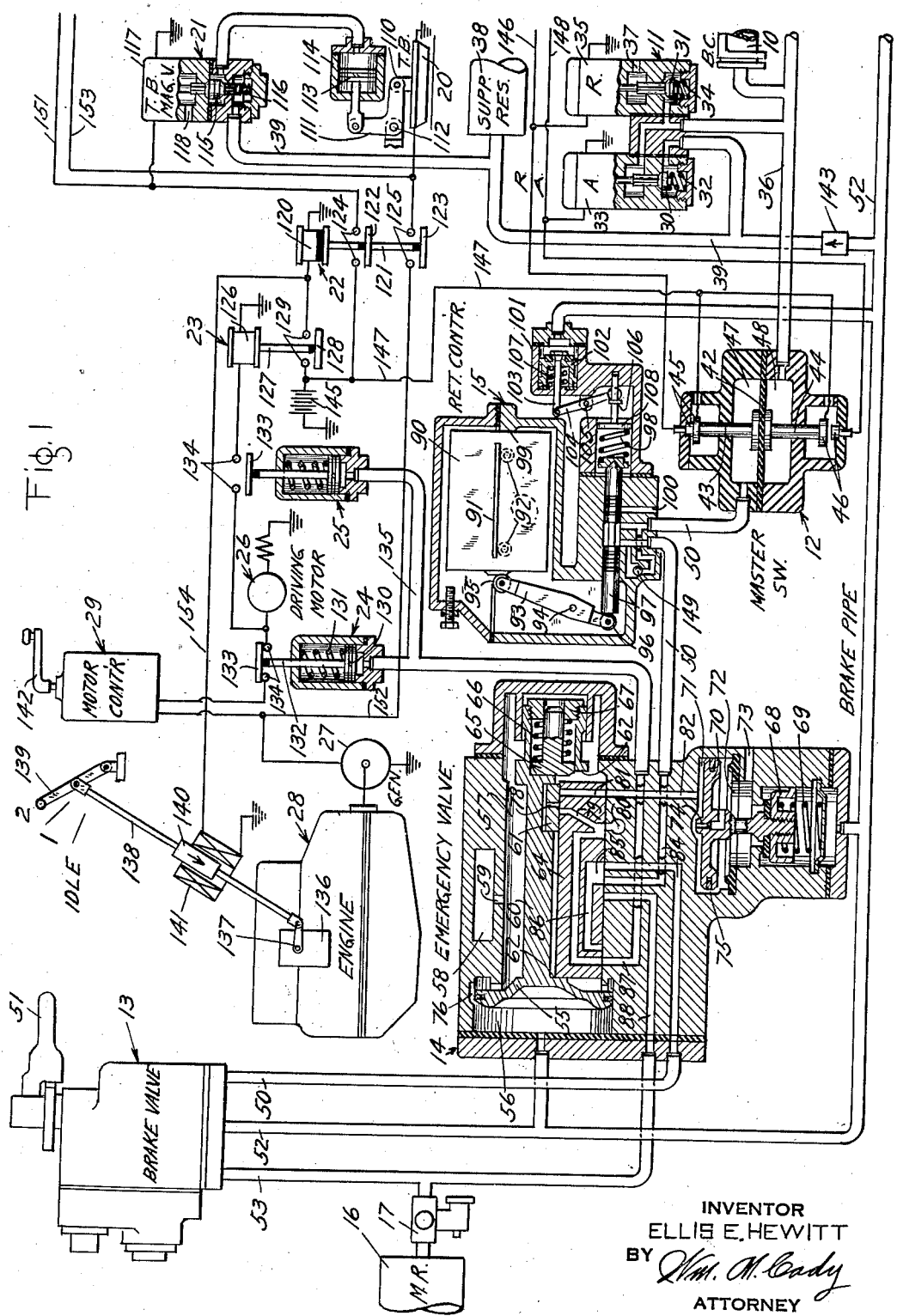
INVENTOR
ELLIS E. HEWITT
BY Wm. M. Cady
ATTORNEY Sept. 20, 1938. E. E. HEWITT 2,130,621
MAGNETIC BRAKE CONTROL
Filed Jan. 13, 1937 3 Sheets-Sheet 2
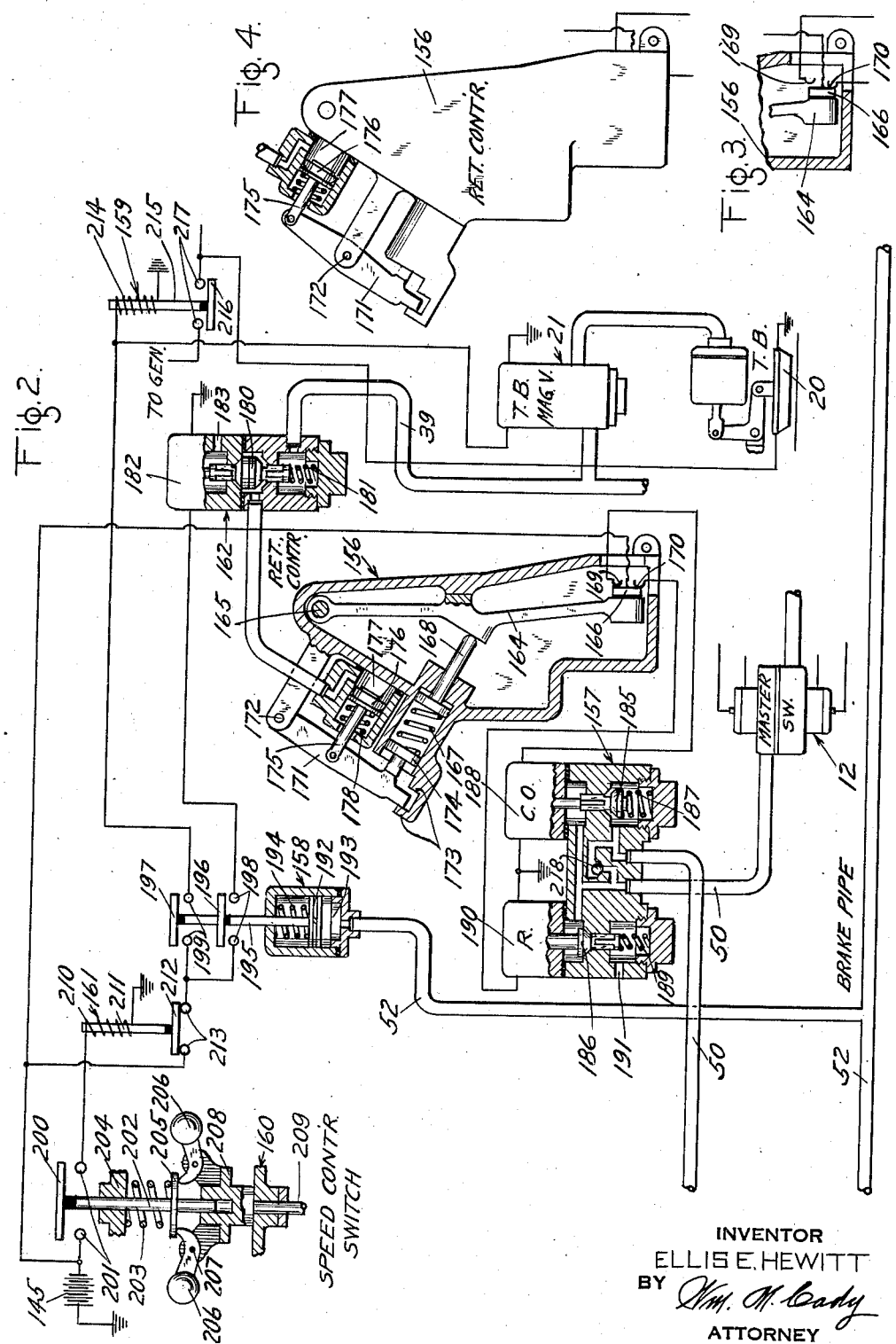
INVENTOR
ELLIS E. HEWITT
BY Wm. W. Cady
ATTORNEY Sept. 20, 1938.  E. E. HEWITT  2,130,621
MAGNETIC BRAKE CONTROL
Filed Jan. 13, 1937  3 Sheets-Sheet 3

SPEED CONTR. SWITCH

INVENTOR
ELLIS E. HEWITT
BY *Wm. M. Cady*
ATTORNEY

Patented Sept. 20, 1938

2,130,621

UNITED STATES PATENT OFFICE 2,130,621

MAGNETIC BRAKE CONTROL

Ellis E. Hewitt, Edgewood, Pa., assignor to The Westinghouse Air Brake Company, Wilmerding, Pa., a corporation of Pennsylvania Application January 13, 1937, Serial No. 120,385

26 Claims. (Cl. 303—3)

This invention relates to magnetic brake control, and more particularly to brake equipment employing both fluid pressure operated brakes and magnetic track brakes, in which the magnetic track brakes are controlled by and in relation to the application of the fluid pressure brakes.

With the advent of trains operating at unusually high speeds, as for example in the neighborhood of one hundred miles per hour, the problem of stopping such trains in short distances becomes of first importance. The fundamental brake for such trains is the familiar fluid pressure operated type of brake. As is well understood, this brake comprises brake shoes operating upon the treads of the vehicle wheels.

Due to the fact that the coefficient of friction between the brake shoes and the wheel treads is relatively low at high vehicle speeds and relatively high at low vehicle speeds, the braking force with which the brakes are initially applied is not as effective at the high speeds as at the low speeds. As a consequence, some difficulty may be experienced in obtaining the necessary braking at the high speeds. Moreover, if the brakes are applied to the maximum degree at a high speed, then as the speed of the vehicle diminishes, and the coefficient of friction between the brake shoes and wheel treads increases, the braking force must be reduced, or otherwise wheel sliding may result.

In order to provide for adequate braking at the high speeds, it has heretofore been proposed to provide magnetic track brakes to augment the fluid pressure brakes. However, when making ordinary or service stops the fluid pressure brakes will in most cases be adequate, but in emergency cases, as when applying the brakes to avoid collision, additional braking may be required. It is therefore desirable that where magnetic track brakes are provided as supplementary to the usual fluid pressure brakes, the fluid pressure brakes only be applied when effecting service applications of the brakes, but when emergency applications are effected that both the fluid pressure brakes and the magnetic track brakes be applied.

When the train has been brought to a stop, if the magnetic track brake devices remain energized excessive heating may result, and the windings of these devices may be burnt out. In order to avoid this it is desirable that the magnetic track brake devices be deenergized at or about the time the train is brought to a stop.

With the foregoing considerations in mind, it is a principal object of the present invention to provide a brake equipment employing both fluid pressure brakes and magnetic track brakes, in which the fluid pressure brakes only are applied during service applications, and in which the fluid pressure brakes and magnetic track brakes are concurrently applied in emergency applications, with the track brakes automatically cut out of action at or near the end of the stop.

As before mentioned, due to the fact that the coefficient of friction between the brake shoes and wheel treads increases with decreasing speed, the braking force with which the fluid pressure brakes are applied must be reduced as the vehicle speed diminishes, when a full application is made, or otherwise wheel sliding may result. It has heretofore been proposed to employ a retardation controller device, which operates responsive to the rate of retardation of the train, to automatically reduce the braking force as the vehicle speed diminishes, and thereby minimize the danger of wheel sliding.

It is a further object of the present invention to provide a brake equipment of the type hereinbefore referred to, in which a retardation controller device is employed to control the fluid pressure brakes, so as to minimize the danger of or prevent wheel sliding.

If a retardation controller device is provided it will be obvious that its adjustment should be different for emergency applications of the brakes than for service applications. That is to say, if the device is adjusted to limit the permissible rate of retardation to one maximum value for a service application, it should be adjusted to permit a higher maximum value during emergency applications. Accordingly, therefore, it is a yet further object of the invention to provide a brake equipment of the type hereinbefore referred to employing a retardation controller device in which the adjustment of the retardation controller device is automatically changed at the time the track brakes are applied, so as to permit a higher maximum rate of retardation than permissible during service applications.

It is also a further object of the invention to provide a brake equipment embodying the features set forth in the preceding objects, with the additional feature that when the track brakes are released (during an emergency application) the adjustment of the retardation controller device is reduced so as to permit the maximum rate of retardation normally permissible only for service applications of the brakes.

If in the type of brake equipments hereinbefore referred to, the track brakes are cut out of action an appreciable interval of time before the train is brought to a stop, the retardation controller device may function to increase the degree of application of the fluid pressure brakes. This may not be desirable in all cases, as the degree to which the fluid pressure brakes are applied at the time the track brakes are cut out of action may be fully adequate to bring the train to a stop promptly. I, therefore, contemplate, as a further object of the present invention, the provision of means in connection with brake equipments of the type hereinbefore referred to, wherein an increase in the degree of application of the fluid pressure brakes is prevented upon the release of the track brakes before the train has been brought to a stop. That is to say, if the pressure of fluid in the brake cylinder of the fluid pressure brakes is at or above a given value at the time the track brake devices are deenergized, the then obtaining brake cylinder pressure cannot be increased before the train has been brought to rest.

In the most modern type of high speed trains, the propelling means comprises electric motors which receive electric power from an engine driven generator on the train. The engine which drives the generator is usually operated at some fairly high constant speed during the operation of the train. When the driving motors are disconnected from the generator, it is customary to reduce the speed of the engine to an idling speed. However, if the track brake devices are energized from the generator, as I contemplate doing, the engine speed should be maintained reasonably high. It is, therefore, a still further object of the invention to provide a brake equipment of the type hereinbefore referred to, in which upon disconnecting the driving motors from the generator and applying the magnetic track brakes, a means is automatically operated to insure that the speed of the generator engine will be maintained high enough so that the track brake devices will be fully and sufficiently energized.

Other and more specific objects of the invention, dealing with the construction and arrangement of parts, will be more fully understood from the following description of several embodiments of my invention, which description is taken in connection with the attached drawings, wherein, Fig. 1 shows in schematic and diagrammatic form an embodiment of my invention as adapted to the head end or control car of a high speed train.

Fig. 2 illustrates in schematic and diagrammatic form a modification of the equipment shown in Fig. 1.

Fig. 3 is a fragmentary detail view of a portion of the retardation controller device shown centrally of Fig. 2.

Fig. 4 shows an alternative adjustment mechanism for that shown for the retardation controller device of Fig. 2.

*Embodiment of Fig. 1*

Figure 5:
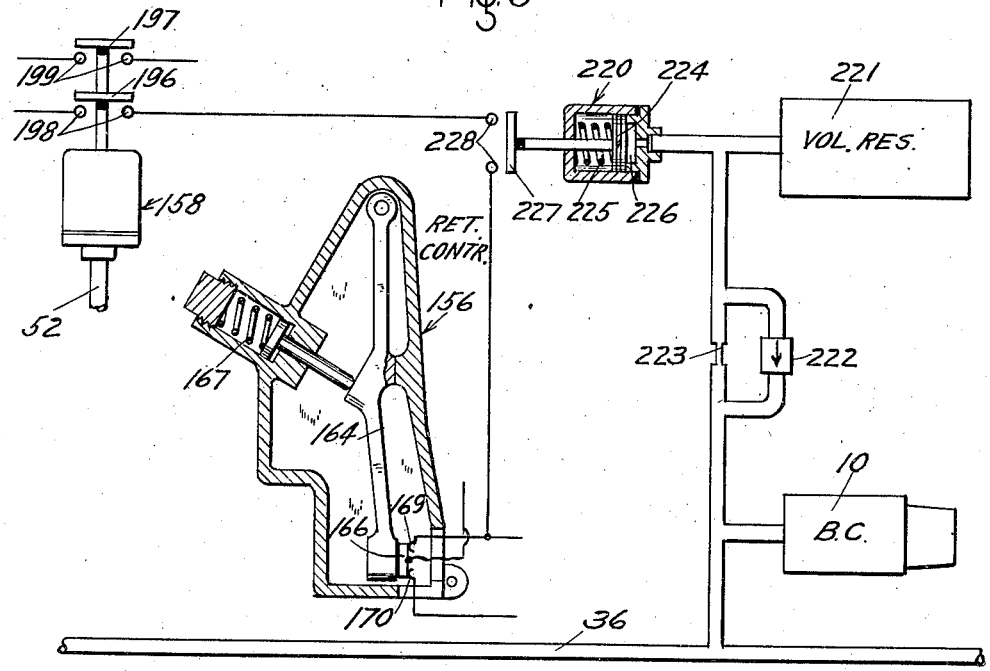
Figs. 5 and 6 show in fragmentary form certain modifications of the apparatus illustrated in Fig. 2.

The embodiment of Fig. 1 has been illustrated in connection with a fluid presure brake equipment of the type described and claimed in the pending application of Ellis E. Hewitt, Serial No. 741,063, filed August 21, 1934. The equipment as illustrated here has been, of course, greatly simplified.

As shown, a brake cylinder is indicated at 10, an application and release magnet valve device at 11, a master switch device at 12, a brake valve device at 13, an emergency valve device at 14, a retardation controller device at 15, a main reservoir at 16, and a feed valve device at 17.

To the fluid pressure brake equipment has been added a magnetic track brake equipment comprising one or more magnetic track brake devices 20, a track brake magnet valve device 21, and an application and release relay 22. For timing the duration of application of the track brakes there is provided a timing relay 23.

Interlocking the magnetic track brake system and the fluid pressure brake system are two pneumatic switch devices 24 and 25.

For driving the control or head end car of the train, there is diagrammatically indicated a driving motor 26, which receives electric power from a generator diagrammatically indicated at 27, which generator is driven by an internal combustion engine 28. The supply of power from the generator 27 to the driving motor 26 is controlled by a motor controller device 29.

Considering now more in detail the devices and apparatus above enumerated, the application and release magnet valve device 11 comprises an application valve 30 and a release valve 31. The application valve 30 is urged toward seated position by a spring 32, and is actuated to unseated position upon energization of an electromagnet 33. Similarly, the release valve 31 is urged toward seated position by a spring 34, and is actuated to unseated position upon energization of an electromagnet 35.

When the application electromagnet 33 is deenergized and the release electromagnet 35 is energized, as shown, a communication is established between a straight air pipe 36 and the atmosphere, by way of the now unseated release valve 31 and exhaust port 37. When the release electromagent 35 is deenergized and the application electromagnet 33 is energized, this communication to the atmosphere is closed, and communication is established between a supply reservoir 38 and the straight air pipe 36, by way of supply pipe 39, and past the now unseated application valve 30.

The master switch device 12 is embodied in a casing, preferably comprised of insulating material, as for example micarta or bakelite, and has centrally disposed therein a flexible diaphragm 42, which has connected thereto, on opposite sides thereof, two stems 43 and 44. The stem 43 is effective in operating release contacts 45, while the stem 44 is effective in operating application contacts 46. The diaphragm 42 is so constructed and arranged that in its normal or unflexed state the release contacts 45 are maintained closed while the application contacts 46 are maintained open.

The diaphragm 42 is subject on its uppermost side to pressure of fluid in a chamber 47 and on its lowermost side to pressure of fluid in a chamber 48. The chamber 47 is connected to one section of a control pipe 50, while the chamber 48 is connected to the aforementioned straight air pipe 36.

When fluid under pressure is supplied to the chamber 47 the diaphragm 42 will be flexed downwardly, whereupon contacts 45 will be opened and contacts 46 closed. When, subsequently, fluid under pressure is supplied to the chamber 48, and the pressure in this chamber reaches a value slightly below the pressure in chamber 47, the diaphragm 42 will be flexed upwardly and thereby cause opening of contacts 46. If the pressure in chamber 48 should appreciably exceed the pressure in chamber 47, the contacts 45 will be then closed. However, if the pressure in chamber 48 remains slightly below the pressure in chamber 47 both sets of contacts 45 and 46 will remain open.

The brake valve device 13 is preferably of the type illustrated in the aforementioned Hewitt application, Serial No. 741,063. For the purposes of the present disclosure, the brake valve device may be considered as having a handle 51, which is movable out of a release position to any one of a plurality of positions in an application zone, and beyond said application zone to an emergency position. When the handle 51 is in the release position, the control pipe 50 is connected to the atmosphere, and a brake pipe 52 is connected to a feed valve pipe 53. The feed valve pipe 53 is, as illustrated, connected to the feed valve device 17, which valve device is to be understood as being of conventional design, and functions to deliver fluid under pressure from the main reservoir 16 to the feed valve pipe 53 at some substantially fixed pressure.

When the brake valve handle 51 is moved out of release position to some position in the service application zone, the communication between the control pipe 50 and the atmosphere is closed, and fluid under pressure is supplied from the feed valve pipe 53 to the control pipe 50, to a degree dependent upon the extent of movement of the handle 51 into the service application zone. During this movement of the handle the brake pipe 52 remains in communication with the feed valve pipe.

When the handle 51 is moved to the emergency position, fluid under pressure is supplied to the control pipe 50 to the maximum possible degree, while communication between the brake pipe 52 and the feed valve pipe 53 is closed, and the brake pipe 52 is vented to the atmosphere at an emergency rate.

The emergency valve device 14 is embodied in a casing having disposed therein a piston 55, subject on one side to the pressure of fluid in a chamber 56 and on the other side of the pressure of fluid in a slide valve chamber 57. The slide valve chamber 57 is in communication with a quick action chamber 58 by way of port 59. The piston 55 is provided with a stem 60 which is recessed to receive and move coextensive with movement thereof a graduating valve 61. The stem 60 is also provided with shoulders 62 which are adapted to engage, after a lost motion movement of the piston 55, a main slide valve 64.

Also carried by the stem 60 is a graduating stop 65, which is urged to the left by a spring 66. As will be observed, tension on the spring 66 may be adjusted by a nut 67.

In a lower part of the valve device casing is a vent valve 68, which is urged toward a seated position by a spring 69. Attached to the vent valve 68 is a piston 70, which is subject on its uppermost side to pressure of fluid in a chamber 71, and on its lowermost side to pressure of fluid in a chamber 72 normally open to the atmosphere by way of passage 73. The piston 70 contains a small or restricted port 74 therein providing a restricted communication between the chambers 71 and 72. Also, there is provided a restricted passage 75 in the bushing in which the piston moves, which establishes a communication around the piston when in the illustrated position.

Considering now the operation of the emergency valve device 14, the chamber 56, to the left of piston 55, is connected to the brake pipe 52, and when the piston is in the illustrated position a feed groove 76 provides communication between the chamber 56 and the slide valve chamber 57 and quick action chamber 58. With the brake pipe 52 fully charged, and piston 55 in the illustrated position, all of these chambers will be charged to brake pipe pressure.

When a reduction in brake pipe pressure is effected at a service rate (not of practical importance here, but of importance in a practical brake system of the type illustrated in the aforementioned Hewitt application), the overbalancing pressure of fluid in chambers 57 and 58 will cause the piston 55 to move to the left, closing the feed groove 76. As the piston closes the feed groove, the graduating stop 65 engages the right end of the main slide valve 64, and tends to arrest further movement of the piston. At this point a small port 78 in the graduating valve 61 is brought into registration with a port 79 in the main slide valve, which at this time is open to an exhaust port 80. Fluid under pressure will then flow from the chambers 57 and 58 to the atmosphere. The size of the port 78 is made such that the pressure in chambers 57 and 58 will reduce at substantially the same rate as the pressure reduces in the chamber 56, due to the reduction of pressure in the brake pipe at a service rate. Therefore, when the full reduction in brake pipe pressure has been effected, the piston 55 will move back to the illustrated position, where it will remain if no further reduction in brake pipe pressure takes place.

If, however, the pressure in the brake pipe 52 is initially, or subsequently, reduced at an emergency rate, the greatly overbalancing pressure in the chambers 57 and 58 will cause the piston 55 to move outwardly and compress the spring 66 behind the stop 65. The graduating valve 61 will be then shifted such that a port 81 in the main slide valve is uncovered, which port at this time is in registration with a passage 82 leading to the piston chamber 71. Fluid under pressure will then flow from the chambers 57 and 58 to the piston chamber 71. This flow is intended to take place rapidly enough to move the piston 70 downwardly, and thereby unseat the vent valve 68.

Unseating of the vent valve opens communication between the brake pipe 52 and the exhaust passage 73, so that there is immediately produced a sharp drop in brake pipe pressure, which of course occurs adjacent each emergency valve device where there is such a device on each car in the train. This sharp drop in brake pipe pressure at each emergency valve device will cause the piston 55 in each device to be moved to its extreme left hand position, where the main slide valve 64 uncovers the passage 82, and where exhaust port 80 is blanked by the main slide valve. In addition, the main slide valve interrupts communication between two passages 84, which two passages connect, respectively, with the two adjacent sections of the control pipe 50, and which were previously connected together by cavity 85 in the main slide valve. A port 86 in the main slide valve is in the extreme left hand position of the piston 55 brought into communication with a passage 87. Since the port 86 is also in communication with the cavity 85, which at this time connects the left hand passage 84 with a passage 88 leading to the feed valve pipe 53, it follows that fluid under pressure can flow from the feed valve pipe 53 to both the left hand passage 84 and to the passage 87.

With the chambers 57 and 58 open to the piston chamber 71, the pressure in these chambers will be exhausted after a predetermined length of time, due to the presence of the restricted port 74 in the piston 70. However, this will not take place until after the pressure in the brake pipe will have been substantially depleted, so that the parts of the emergency valve device, that is, the main slide valve 64 and piston 55, will remain in the extreme left hand position.

Upon a restoration of pressure in the brake pipe 52, the piston 55 will move back to the illustrated position, carrying with it the graduating valve 61 and main slide valve 64, to reestablish the communications as illustrated in Fig. 1.

Considering now the retardation controller device 15, this device is preferably embodied in a casing having disposed therein a body 90 provided with flanges or wings 91 which roll upon rollers 92 carried by the casing. At one end of the body 90 is disposed a lever 93, which is pivotally mounted upon a pin or rod 94 carried by the casing. The lever 93 is bifurcated at its upper end and carries between the bifurcations a roller 95 which engages one end of the body 90. The lever 93 is also bifurcated at its lower end, and carries between the bifurcations there a second roller 96 which engages one end of a slide valve 97. The slide valve 97 is operable in the illustrated position to connect two adjacent sections of the control pipe 50. At the opposite end of the slide valve 97 is disposed a spring 98. This spring biases the slide valve to the illustrated position, and as a consequence holds the body 90 against a stop 99.

The retardation controller device is preferably positioned upon the vehicle such that when the vehicle is decelerating the resultant force of inertia acts to urge the body 90 to the left. As the body 90 moves to the left it shifts the slide valve 97 to the right, against opposition of the spring 98. The spring 98 is a calibrated spring, so that the degree to which the slide valve 97 is shifted is proportional to the rate of deceleration of the vehicle. When the body 90 has been moved under a force of inertia corresponding to a predetermined rate of retardation, the slide valve 97 will have been shifted to a position where it blanks the left hand section of the control pipe 50. At a higher rate of retardation the slide valve 97 will be shifted to the position where the right hand section of the control pipe 50 will be connected to an exhaust port 100.

The rates of retardation required to shift the slide valve, as just described, may be varied by varying the tension on the spring 98. For accomplishing this there is provided an adjusting mechanism comprising a cylinder 101 in which is disposed a piston 102. Attached to the piston 102 is a stem 103, one end of which is loosely attached to one end of a lever 104 pivotally mounted at 105 to the casing. The other end of the lever engages a stop 106 on the stem of an abutment 108 which presses against the spring 98.

The cylinder 101 is connected to the brake pipe 52, and so long as the brake pipe is charged the piston 102 is biased to the left, thereby placing a minimum tension on the spring 98. Upon a reduction of pressure in the brake pipe 52 to effect an emergency application of the brakes, a spring 107 to the left of the piston 102 forces the piston to its extreme right hand position, and thereby places additional tension on the spring 98. The retardation controller device is thus adjusted to permit a higher rate of retardation during emergency applications of the brakes.

Considering now the magnetic track brake equipment, the track brake device 20 may be of any of the conventional types, which has projecting upwardly therefrom a lug 110, to which is secured one arm of a bell crank lever 111. The bell crank lever 111 is preferably pivotally mounted at 112 to some portion of the vehicle truck. The other arm of the bell crank lever 111 is connected to the stem of a piston 113 disposed in a raising cylinder 114. So long as fluid pressure is maintained in the raising cylinder 114, the piston 113 will be biased to the left and cause the track brake device 20 to be held suspended above the track rail. When fluid under pressure is released from the raising cylinder 114, the track brake device 20 will drop to engagement with the rail under the force of gravity.

The track brake magnet valve device 21 is embodied in a casing having disposed therein a double beat valve 115, which is urged toward an upper seated position by a spring 116. An electromagnet 117 in the upper part of the valve device casing functions when energized to shift the double beat valve 115 to lower seated position. When the double beat valve 115 is in upper seated position, as shown, a communication is established between the supply reservoir pipe 39 and the cylinder 114. When the double beat valve is in lower seated position this communication is closed, and the cylinder 114 is vented to the atmosphere by way of exhaust port 118.

The application and release relay 22 comprises a winding or solenoid 120, which is operable when energized to actuate upwardly a stem 121. Carried by and insulated from the stem 121 are two contact members 122 and 123. When the winding 120 is deenergized the contact members 122 and 123 are positioned as shown, but when the winding is energized the contact member 122 engages stationary contacts 124 while the contact member 123 engages stationary contacts 125. This relay is preferably of the slow release type, for a reason which will be apparent later.

The timing relay 23 comprises a winding 126 which is effective when energized to actuate upwardly a stem 127. The stem 127 carries insulated therefrom a contact member 128 which is operable when the stem is actuated upwardly to engage two stationary contacts 129.

The two pneumatic switch devices 24 and 25 comprise essential like parts, each being embodied in a casing having contained therein a piston 130, which is biased to a lower portion by a spring 131. Attached to the piston is a stem 132 which carries insulated therefrom a contact member 133. Contact member 133 is adapted to engage stationary contacts 134. As will be observed, in the case of the switch device 24 the contact member 133 engages contacts 134 when the piston 130 is in the lower position, and in the case of the switch device 25 the contact member 133 engages the contacts 134 for the upper position of the piston.

Both pneumatic switch devices 24 and 25 are connected to a pipe 135 which leads to the passage 87 in the emergency valve device 14. Therefore, when fluid under pressure is supplied to the passage 87 it flows to both switch devices.

The vehicle driving motor 26 has been indicated in diagrammatic form only as representative of a number of such motors which may be employed.

Similarly, the engine 28 has been indicated diagrammatically only and may be considered as having a carburetor, or other fuel feeding device, 136, which is operated upon movement of a throttle 137. Attached to the throttle 137 is a rod or stem 138, which is operable by a hand lever 139. The hand lever 139 may have an idling position and several operating positions as indicated by the numerals 1 and 2.

Secured to the rod or stem 138 is a highly magnetic member 140, as a soft piece of iron or steel, and concentrically disposed with respect to this member is a solenoid 141. The purpose of this arrangement will be more fully hereinafter described.

The motor controller 29 may be considered to be of conventional design, as the details of this device are not an essential part of the present invention. The motor controller is preferably provided with a handle 142 for operation thereof.

The operation of this embodiment of my invention is as follows:

Running condition

When the vehicle is running under power the brake valve handle 51 is maintained in the release position. In this position of the handle, as before described, the control pipe 50 is in communication with the atmosphere, and the brake pipe 52 is maintained charged from the feed valve pipe 53. Fluid under pressure in the brake pipe 52 flows to the chamber 56 in the emergency valve device 14, and by way of the feed groove 76 to the slide valve chamber 57 and quick action chamber 58. Fluid under pressure in the brake pipe also flows to the chamber below the vent valve 68, and to the cylinder 101 on the retardation controller device 15.

At the same time, fluid under pressure flows to the supply reservoir 38 by way of one-way check valve device 143. The system is, therefore, charged and ready for operation.

While the vehicle is in operation the engine operating handle 139 is preferably turned to one of the operating positions, as illustrated. The engine 28 is, therefore, driven at an operating speed. The motor controller 29 is then operated to supply power from the generator 27 to the driving motor 26, to drive the vehicle at the desired speed.

With the control pipe 50 maintained connected to the atmosphere, the fluid pressure brakes will be maintained fully released. At the same time, fluid under pressure will be supplied from the supply reservoir 38 to the track brake raising cylinder 114, so as to hold the track brake device 20 suspended above the track rail. The application and release relay 22 will be deenergized, so that the winding of the track brake device will also be deenergized.

Service applications of the brakes

When it is desired to effect a service application of the brakes, the motor controller handle 142 is thrown to the off position, and the brake valve handle 51 is turned to a position in the service application zone. Fluid under pressure will be then supplied to the control pipe 50 to a degree corresponding to the position of the brake valve handle in the service application zone. Fluid under pressure supplied to the control pipe 50 flows to the chamber 47 in the master switch device 12, by way of a first section of the control pipe 50, passages 84 and cavity 85 in the emergency valve device 14, a second section of the control pipe 50, through the retardation controller device 15, and a third section of the control pipe 50. The diaphragm 42 will then be flexed downwardly to open the release contacts 45 and close the application contacts 46.

When the release contacts 45 were closed, they established a circuit between a battery 145 and a release train wire 146, which circuit included conductor 147, the release contacts 45, and the train conductor 146. Energization of the train conductor 146 maintained the release electromagnet 35 in each application release magnet valve device 11 energized, and when the contacts 45 are opened this electromagnet will be deenergized, whereupon the release valve 31 will be seated by its spring 34.

When contacts 46 are closed, a circuit is established from the battery 145 to an application train wire 148, whereupon the application electromagnet 33 in each valve device 11 will be energized to unseat supply valve 30. Fluid under pressure will then flow from the supply reservoir 38 to the straight air pipe 36, and consequently to the brake cylinder 10 and to the chamber 48 in the master switch device 12.

When the pressure in the chamber 48 and brake cylinder 10 is slightly below the pressure in chamber 47 the diaphragm 42 will flex upwardly and open the application contacts 46, while at the same time holding the release contacts 45 open. This will deenergize the application electromagnet 33 in each valve device 11, and thereby lap the supply of fluid under pressure to the straight air pipe 36 and brake cylinder 10. The degree of brake cylinder pressure will then correspond to the position of the brake valve handle 51 in the application zone.

The magnetic track brakes are not applied for a service application of the brakes, as the emergency valve device 14 must be operated to effect the operation of the track brake system, and since during a service application the brake pipe 52 is maintained charged, no operation of the track brake system takes place.

As the train begins to decelerate due to application of the fluid pressure brakes, the resulting force of inertia urges the body 90 of the retardation controller device to the left. It will be observed that the tension on the spring 98 at this time is a minimum, because with the brake pipe charged the pressure in the adjusting cylinder 101 is maintained at brake pipe pressure.

If now the rate of retardation should reach a value such that the slide valve 97 is shifted to blank the communication to the third section of the control pipe 50, it will be apparent that the brake valve device 13 will be isolated from communication with the switch chamber 47. If the rate of retardation should increase to the point where the slide valve 97 opens communication between the third section of the control pipe 50 and the atmospheric port 100, fluid under pressure will be released from the switch chamber 47. Upon release of fluid under pressure from the chamber 47, the diaphragm 42 flexes upwardly and closes the release contacts 45. This will result in energizing the release electromagnet 35 in each valve device 11, whereupon due to the unseating of the release valve 31 fluid under pressure will be released from the straight air pipe 36 and brake cylinder 10.

With the resulting decrease in the degree of application of the brakes, the rate of retardation will diminish and the body 90 will move toward the right. The slide valve 97 will move to the left and terminate the release of fluid under pressure from the switch chamber 47. When the pressure in the chamber 48 attains a value slightly less than that in chamber 47 the application will again be lapped.

A little thought will show that the retardation controller device will cycle, or will move between lap and release positions, as the speed of the train diminishes and the resulting braking effect increases due to the increase in the coefficient of friction between the brake shoes and wheel treads. That is to say, the retardation controller device will function to continually reduce brake cylinder pressure when the increase in coefficient of friction tends to increase the ultimate braking effect.

At any time it is desired to release the brakes, this may be accomplished by returning the handle 51 to release position. This will result in a decrease of pressure in the switch chamber 47, and thereby cause a like decrease of pressure in the straight air pipe 36 and brake cylinder 10. If at the time such a release is desired, the slide valve 97 in the retardation controller device has interrupted communication to the third section of the control pipe 50, the release will be accomplished by the unseating of the check valve 149, which will open a one-way communication between the third and second sections of the control pipe.

*Emergency applications of the brakes*

When it is desired to effect an emergency application of the brakes, the brake valve handle 51 is turned to the emergency position, whereupon fluid under pressure is supplied to the control pipe 50 to the maximum degree, and at the same time fluid under pressure is released from the brake pipe 52 to the atmosphere at an emergency rate. As before described, the emergency valve device 14 responds and shifts its main slide valve 64 to the extreme left hand position. The main slide valve then opens communication between the passage 88 and each of the passages 87 and the left hand passage 84, while blanking the right hand passage 84. Fluid at feed valve pressure then flows through the second section of the control pipe 50 and from thence to the switch chamber 47, and also by way of pipe 135 to each of the pneumatic switch devices 24 and 25.

Fluid under pressure supplied to the switch chamber 47 will effect the operation of the application and release magnet valve devices 11 as before described for a service application of the brakes.

Fluid under pressure supplied to the pneumatic switch device 24 will cause the contact member 133 thereof to disengage from the stationary contacts 134, and thus open the circuit to the driving motors, in case this has not already been done by movement of the controller handle 142 to the off position.

Fluid under pressure supplied to the pneumatic switch device 25 will cause its contact member 133 to engage the stationary contacts 134. This will connect the timing relay 23 to the driving motor 26, which will now operate as a generator and will energize the relay winding 126. The relay 23 will then quickly cause its contact member 128 to engage the contacts 129. This will in turn energize the application and release relay winding 120 from the battery 145. The application and release relay will then quickly cause contacts 122 to engage contacts 124, and contact 123 to engage contacts 125.

When contact 122 engages contacts 124, the battery 145 is connected to a train wire 151, and thereby energizes the electromagnet 117 of each track brake magnet valve device 21. This will result in lowering of each track brake device 20 into engagement with the track rail. At the same time, engagement of relay contact 123 with contacts 125 establishes a circuit from the generator 27 to the track brake device, by way of conductor 152, and at the same time energizing train conductor 153 so as to energize all of the track brake devices throughout the train. The track brakes will thus be fully applied.

When the timing relay contacts 128 and 129 engage, the solenoid 141 is energized, by way of conductor 154. The purpose of energizing this solenoid is to insure that the engine 28 is kept running at a speed high enough for the generator 27 to deliver sufficient energy for the track brake devices. When energy is being supplied to the driving motors the hand lever 139 is maintained in a running position. When, however, the supply of energy to the driving motors is cut off, it is customary to move the hand lever 139, either manually or automatically, to an idling position, so as to not waste engine fuel needlessly.

When the solenoid 141 is energized the core 140 is attracted inwardly thereof, regardless of to which side of the solenoid the core happens to be initially, and when the core comes to rest centrally of the solenoid the engine throttle 137 will be in a position to operate the engine and generator at a speed sufficiently high to meet the requirements of the track brake devices, and yet at a speed which is economical.

When the pressure in the brake pipe is reduced at an emergency rate, the piston 102 in the retardation controller adjusting mechanism moves to its extreme right hand position, and the tension on the spring 98 is increased, as before described. The retardation controller is thus adjusted to permit a higher maximum rate of retardation, and the retardation controller device will function as before described for a service application of the brakes to control the fluid pressure brakes only. The total braking produced will, of course, be that due to the joint and concurrent application of both the magnetic track brakes and the fluid pressure brakes, but the track brakes remain applied to a degree according to the initial energization of the track brake devices, whereas the brake cylinder pressure in the fluid pressure brakes is modified as is necessary to cause the train to be decelerated at a rate of retardation not exceeding that according to the adjustment of the retardation controller device.

As the speed of the train diminishes to some low value, at or near the end of the deceleration period, the voltage delivered by the driving motor 26 will be insufficient to maintain the timing relay 23 energized. This relay will then open its contacts 129 and deenergize the application and release relay 22, which, due to its slow release action, opens its contacts after a slight delay. This will result in a complete release of the magnetic track brakes.

At the same time, deenergization of the timing relay 23 deenergizes the solenoid 141, so that the engine speed may be adjusted, either by automatic means or by manual manipulation of the handle 139. The delay provided by relay 22 permits the track brake devices to be deenergized at the low engine speed, which reduces contact arcing and danger of high induced voltage.

The train will then be brought to a stop due to application of fluid pressure brakes only, and when it is desired to release the brakes, the brake valve handle 51 is returned to the release position, whereupon the brake pipe 52 will again be charged to normal value. With recharging of the brake pipe the parts of the emergency valve device 14 will move to the illustrated position, and release of fluid under pressure from the switch chamber 47 will take place to the atmosphere through the communication established in the brake valve device 13. A full release of the fluid pressure brakes will then result in the same manner as described for a release following a service application.

*Modification shown in Fig. 2*

The embodiment of Fig. 2 deals with the substitution of certain devices for some of the devices shown in Fig. 1.

In Fig. 2, a retardation controller device of the electric type, shown at 156, and its cut off and release magnet valve device 157, have been substituted for the pneumatic type retardation controller device 15 of Fig. 1. As will be observed, the magnet valve device 157 has been disposed in the control pipe 50 between the emergency valve device 14 and the master switch device 12, as was the retardation controller 15.

Also in Fig. 2, a pneumatic switch device 158 and a relay 159 replace the pneumatic switch device 25 and the application and release relay 22 of Fig. 1. The pneumatic switch device 24 of Fig. 1 may be still retained in the motor circuit, which has been omitted in Fig. 2.

The timing relay 23 of Fig. 1 has been replaced in Fig. 2 by a speed controlled switch device 160, together with a relay 161.

The adjusting cylinder 101 for the retardation controller device of Fig. 1, has now been replaced by that provided on the new retardation controller 156, together with an adjusting magnet valve device 162.

As will be observed from the arrangement shown in Fig. 2, the new parts are connected in the system of Fig. 1 to the pipes and circuits of that system as indicated by the like use of numerals.

Considering now more in detail the new devices of Fig. 2, the retardation controller device 156 is embodied in a casing having pivotally mounted therein a pendulum 164, suspended at 165, and carrying insulated therefrom a contact 166. The pendulum 164 is biased to the illustrated position by a calibrated spring 167 acting upon a plunger 168 in engagement with the pendulum. In the illustrated position of the pendulum, the contact 166 engages two resilient stationary contacts 169 and 170.

As in the case of the retardation controller device 15, the pendulum 164 is movable to the left, upon deceleration of the vehicle, a distance proportional to the rate of deceleration, against opposition of the calibrated spring 167. Tension on the spring 167 is governed by an adjusting mechanism comprising an arm 171 pivotally mounted at 172 to the casing and having a limited movement between stops 173. The free end of the arm 171 engages an abutment 174 in contact with the spring 167, while intermediate its ends the arm 171 is connected by a stem 175 to a piston 176 disposed in a chamber 177. The piston 176 is urged to the right by a spring 178.

When the pressure in chamber 177 is at atmospheric pressure, the spring 178 biases the arm 171 to its inner position, in which case the initial tension on the calibrated spring 167 is a maximum. When fluid under pressure is supplied to the chamber 177 to a degree sufficient to compress the spring 178, the arm 171 is actuated outwardly until it engages the outermost stop 173, as illustrated, whereupon the initial tension on the calibrated spring 167 is a minimum.

The adjusting magnet valve device 162 controls the supply of fluid under pressure to and its release from the chamber 177. This magnet valve device comprises a double beat valve 180 which is urged toward an upper seated position by a spring 181, and is actuated to lower seated position upon energization of an electromagnet 182. When the double beat valve 180 is in the upper seated position, as illustrated, the chamber 177 is connected to the supply reservoir pipe 39. When the double beat valve is actuated to the lower seated position, this communication is closed and a communication is opened between the chamber 177 and atmospheric port 183, so that fluid under pressure will be released from the chamber 177 to the atmosphere.

The cut-off and release magnet valve device 157 comprises a cut-off valve 185 and a release valve 186. The cut-off valve 185 is urged toward seated position by a spring 187, and is actuated to unseated position upon energization of an electromagnet 188. The release valve 186 is urged toward unseated position by a spring 189, and is actuated to seated position upon energization of an electromagnet 190.

When the release valve 186 is seated and the cut-off valve 185 is unseated, as illustrated, the two sections of the control pipe 50 are in open communication. When the cut-off valve is seated this communication is closed, and when at the same time the release valve 186 is unseated, the third section of the control pipe 50, that is, the section leading to the master switch device 12, is opened to the atmosphere by way of exhaust port 191.

The pneumatic switch device 158 is embodied in a casing comprising a piston 192 subject on one side to the pressure of fluid in a chamber 193 and on the other side to the pressure of a spring 194. Secured to the piston 192 is a stem 195 which carries insulated therefrom, and from each other, two contact members 196 and 197, the former being adapted to engage stationary contacts 198 and the latter being adapted to engage stationary contacts 199.

The speed controlled switch device 160 comprises a movable contact 200 which is adapted to engage stationary contacts 201. The movable contact 200 is carried by and insulated from a stem 202, which is urged downwardly by a spring 203 acting between a portion 204 of the casing and a collar or washer 205 secured to the stem 202.

The stem 202 is actuated upwardly due to the centrifugal action of two fly ball weights 206, which are pivotally mounted at 207 to a rotatable member 208. The rotatable member 208 is driven by a shaft 209, which rotates at a speed corresponding to the speed of the train, as by coupling to a vehicle wheel, or axle, or some other part which rotates at a speed corresponding to train speed.

The relay 161 comprises a winding or solenoid 210 which when energized attracts upwardly a core 211 to which is secured, and insulated therefrom, a movable contact 212, which then disengages from stationary contacts 213. When the winding 210 is deenergized the movable contact 212 drops by gravity to engagement with the contacts 213.

The relay 159 is similar to the relay 161, comprising a winding or solenoid 214, which when energized attracts upwardly a core 215 having attached thereto and insulated therefrom a movable contact 216, adapted in its uppermost position to engage stationary contacts 217. When the winding 214 is deenergized the core member 215 drops downwardly under the force of gravity, whereupon contact 216 disengages from contacts 217.

In the operation of the brake system with the modifications shown in Fig. 2, the system is charged as before described for the embodiment of Fig. 1. The pneumatic switch device 158 is connected to the brake pipe 52, as illustrated, and so long as the brake pipe is charged the piston 192 will be actuated upwardly so that contacts 197 and 196 are out of engagement with contacts 199 and 198, respectively.

Assuming that the train is traveling at some fairly high speed, the parts of the speed controlled switch device 160 will be in the positions as illustrated. With the contacts of the speed controlled switch device in open position, the other parts connected thereto will be also in the positions as illustrated.

When now upon effecting a service application of the brakes fluid under pressure is supplied to the control pipe 50, it will flow to the master switch device 12, through the cut off and release magnet valve device 157, and will as before described in connection with the embodiment of Fig. 1 effect an application of the fluid pressure brakes, the degree of the application depending upon the degree of movement of the brake valve handle 51 into the service application zone.

As will be observed, the adjusting magnet valve device 162 is deenergized for the condition assumed, so that the double beat valve 180 is in upper seated position, and fluid at supply reservoir pressure is delivered to the chamber 177. As a consequence, the minimum initial tension exists on the adjusting spring 167.

Assuming now that the rate of retardation of the train increases sufficiently to actuate the pendulum 164 to the position illustrated in Fig. 3, the circuit to the cut off electromagnet 188 will be interrupted, and the cut-off valve 185 will be actuated to seated position by the spring 187. This isolates the brake valve device 13 from the master switch device 12 and prevents further supply of fluid under pressure to the switch chamber 47. If the rate of retardation increases further, so that the pendulum contact 166 disengages from the stationary contact 170, then the release electromagnet 190 will be deenergized, and release valve 186 will move to unseated position to release fluid under pressure from the switch chamber 47 to the atmosphere, by way of exhaust port 191. When the rate of retardation has diminished sufficiently for contact 166 to reengage contact 170, the release will be terminated.

It will thus be observed that the retardation controller device 156, together with its magnet valve device 157, perform all of the functions of the pneumatic type retardation controller device 15 of Fig. 1.

When it is desired to release the brakes, the brake valve handle 51 is returned to release position, whereupon fluid under pressure is released from the switch chamber 47, the check valve 218 in the magnet valve device 157 unseating in the event that the cut-off valve 185 is seated at the time the release is made.

When it is desired to effect an emergency application of the brakes, the brake valve handle 51 is turned to the emergency position to reduce brake pipe pressure at an emergency rate.

As before described in connection with the embodiment of Fig. 1, the emergency valve device 14 will function to supply fluid under pressure to the control pipe 50 and master switch device 12 to the maximum degree, to effect a maximum application of the fluid pressure brakes. At the same time, the release of fluid under pressure from the brake pipe 52 causes contacts 197 and 196 of the pneumatic switch device 158 to engage, respectively, contacts 199 and 198.

Engagement of contacts 197 and 199 establishes a circuit from the battery 145 to the relay winding 214, of relay 159, and also to the track brake magnet valve device 21. The magnet valve device 21 will effect the lowering of the track brake device 20 to engagement with the rail, while the engagement of contacts 216 and 217 of the relay 159 will supply electric power from the generator 27 to the energizing windings of the track brake device 20. The track brakes will then be fully applied.

The engagement of contact 196 with contacts 198 of the pneumatic switch device 158 completes a circuit to and energizes the electromagnet 182 of the adjusting magnet valve device 162. As a consequence, the double beat valve 180 is shifted to lower seated position to close communication between the chamber 177 and the supply reservoir, and to open chamber 177 to the atmosphere. As a result the maximum initial tension will be placed on the adjusting spring 167, so that the retardation controller device will be set to permit a higher rate of retardation.

The retardation controlled device will then operate substantially as heretofore described, except that it will permit a higher rate of retardation than for a service application.

When the speed of the train has diminished to a very low speed, as for example five or six miles per hour, the contacts 200 and 201 of the speed controlled switch device 160 will close, thereby energizing the relay 161. This relay will then open its contacts 212 and 213, and thereby deenergize both the relay 159 and the adjusting magnet valve device 162.

Deenergization of the relay 159 completely releases the track brakes, while deenergization of the adjusting magnet valve device 162 results in changing the setting of the retardation controller device back to its lower setting. As a consequence, while the degree of application of the fluid pressure brakes will be increased, to compensate for the decrease in braking due to the release of the track brakes, the train will be brought to a stop at a lower rate of retardation than permitted throughout the greater portion of the deceleration period.

When the train has been brought to a stop, the fluid pressure brakes may be released as heretofore described.

*Modification shown in Fig. 4*

The modification shown in Fig. 4 deals merely with the adjusting mechanism of the retardation controller device 156 of Fig. 2. In Fig. 2 the adjusting magnet valve device 162 is shown of the type which supplies fluid under pressure to the chamber 177 when the electromagnet 182 is deenergized. In case it is desired to employ the type of magnet valve device which connects the chamber 177 to the atmosphere when the electromagnet 182 is deenergized, the adjusting mechanism must be arranged as in Fig. 4, wherein it will be noted that the piston 176 is connected to the end of the lever 171, instead of between the ends. With these changes the retardation controller device will function the same as described in connection with the modification of Fig. 2.

*Modification shown in Fig. 5*

This modification deals with a rearrangement of the devices shown in Fig. 2, with the omission of the adjusting mechanism of the retardation controller device 156, and also omission of the adjusting magnet valve device 162. With the omission of these devices, there is added a pneumatic switch device 220, a volume reservoir 221, a one-way check valve device 222, and a choke or restriction 223 in parallel with the one-way check valve device.

The purpose of this arrangement is to prevent an increase in whatever brake cylinder pressure exists at the time the track brakes are released near the end of the stop, during an emergency application of the brakes.

The pneumatic switch device 220 is embodied in a casing containing a piston 224 urged to the right by a spring 225, and adapted upon supply of fluid under pressure to a chamber 226 to cause engagement of contacts 227 and 228.

When an emergency application of the brakes has been effected, and contacts 196 and 198 of the pneumatic switch device 158 have closed, a circuit is potentially established to the cut off electromagnet 188, in the magnet valve device 157, except that it is dependent upon the closing of the contacts 227 and 228. These contacts close when the brake cylinder pressure has attained a predetermined value. That is to say, when brake cylinder pressure exceeds a predetermined value, regardless of whether the retardation controlled device has or has not energized the cut off electromagnet 188, the electromagnet will be energized through a parallel circuit comprising the contacts of the switch device 158 and the contacts of the switch device 220, so that no further increase in fluid pressure in the brake cylinder 10 and straight air pipe 36 can take place, and the train will, therefore, be brought to a stop with whatever brake cylinder pressure is permitted below this predetermined value by the retardation controller device 156.

The purpose of the choke 223 and the volume reservoir 21 is to delay operation of the switch device 220 for a sufficient interval of time, so that routine yard tests can be made on the brake equipment while the train is at rest, without the interference with these tests by the operation of the switch device 220. The delay occasioned by the operation of the switch device 220 is of no consequence in the normal functioning of the apparatus during an emergency application of the brakes.

Figure 6:
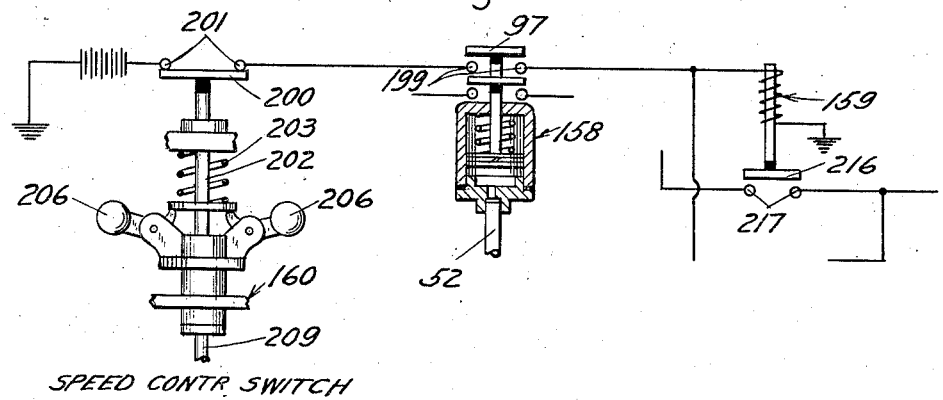

*Modification shown in Fig. 6*

The modification shown in Fig. 6 deals with the rearrangement of the parts of the speed controlled switch device 160 shown in Fig. 2.

In Fig. 2, the contacts 200 and 201 of the speed controlled switch device 160 were shown as being held open above a certain predetermined vehicle or train speed, whereas in Fig. 6 the contacts have been so arranged as to be held closed above said predetermined speed and opened therebelow. That is to say, the relay 159 will be energized at all times above said predetermined speed, and its contacts 216 and 217 have been rearranged so as to be maintained open when the relay is energized, and closed when the relay is deenergized upon opening of contacts 200 and 201 below the predetermined speed. In all other respects the apparatus will function substantially as described for Fig. 2.

While I have described my invention with particular reference to one specific embodiment thereof, and several modifications of this embodiment, it is not my intention to be limited to the exact details shown, nor otherwise than by the spirit and scope of the appended claims.

Having now described my invention, what I claim as new and desire to secure by Letters Patent, is:

1. In a vehicle or train brake system, in combination, a fluid pressure brake system, a magnetic track brake system, control means operative when effecting a service application of the brakes to effect the operation of one of said brake systems only, and when effecting an emergency application of the brakes to effect the concurrent operation of both of said systems, a retardation controller device operable to control the operation of one of said brake systems only to limit the rate of retardation of the train to a predetermined value, and means automatically operable when effecting an emergency application of the brakes to adjust said retardation controller device to permit a higher rate of retardation of the train than said predetermined value.

2. In a train brake system, in combination, a fluid pressure brake system, a magnetic track brake system, control means operative when effecting a service application of the brakes to effect the operation of said fluid pressure brake system only and operable when effecting an emergency application of the brakes to effect the operation of both said fluid pressure brake system and said magnetic track brake system, a retardation controller device operated according to the rate of retardation of the train, and being normally adjusted to limit the rate of retardation to a predetermined value, means responsive to the operation of said retardation controller device for controlling the operation of said fluid pressure brake system only, and means operable when effecting an emergency application of the brakes for adjusting said retardation controller device to permit a rate of retardation higher than said predetermined rate.

3. In a vehicle brake system, in combination, a brake cylinder, a magnetic track brake device, control means operative in effecting a service application of the brakes to effect only a supply of fluid under pressure to said brake cylinder, and operative when effecting an emergency application of the brakes to effect a supply of fluid under pressure to said brake cylinder and concurrently therewith to energize said track brake device, a retardation controller device operable to control brake cylinder pressure, and being normally adjusted to limit the rate of retardation of the vehicle to a predetermined rate, and means operable when effecting an emergency application of the brakes for adjusting said retardation controller device to permit a higher rate of retardation than said predetermined rate.

4. In a vehicle brake system, in combination, a brake cylinder, a magnetic track brake device, straight air means for effecting a supply of fluid under pressure to said brake cylinder, automatic means including a brake pipe and operable upon a reduction of pressure in said brake pipe to effect a supply of fluid under pressure to said brake cylinder and the energization of said track brake device, a retardation controller device operable to control brake cylinder pressure and being normally adjusted to limit the rate of retardation of the vehicle to a predetermined value, and means operable upon a reduction of pressure in said brake pipe for adjusting said retardation controller device to permit a higher rate of retardation than said predetermined rate.

5. In a vehicle brake system, in combination, a brake cylinder, a magnetic track brake device, straight air means for effecting a supply of fluid under pressure to said brake cylinder to effect a service application of the brakes, automatic means including a brake pipe and operable upon a reduction of pressure in said brake pipe at an emergency rate to effect an emergency application of the brakes, means also operative upon an emergency reduction in brake pipe pressure for effecting the energization of said track brake device and engagement thereof with a track rail to produce a track braking effect, a retardation controller device operative to control brake cylinder pressure, and means also operative upon the said reduction in brake pipe pressure for increasing the setting of said retardation controller device.

6. In a vehicle brake system, in combination, a fluid pressure brake system, a magnetic track brake system, straight air means operative to effect the operation of said fluid pressure brake system to effect an application of the fluid pressure brakes, automatic means for effecting the operation of both of said brake systems to effect an application of both the fluid pressure brakes and magnetic track brakes, a retardation controller device for controlling one of said brake systems, and being normally adjusted to permit a predetermined rate of retardation of the vehicle, and electrically controlled means operative in response to operation of said automatic means for adjusting said retardation controller device to permit a higher rate of retardation.

7. In a vehicle brake system, in combination, a fluid pressure brake system, a magnetic track brake system, straight air means operative to effect the operation of said fluid pressure brake system to effect an application of the fluid pressure brakes, automatic means for effecting the operation of both of said brake systems to effect an application of both the fluid pressure brakes and magnetic track brakes, a retardation controller device for controlling one of said brake systems, and being normally adjusted to permit a predetermined rate of retardation of the vehicle, and a magnet valve device operative in response to operation of said automatic means for effecting an adjustment of said retardation controller device to permit a higher rate of retardation of the vehicle.

8. In a train brake system, in combination, a fluid pressure brake system, a magnetic track brake system, control means operative to effect the operation of said fluid pressure brake system only when effecting a service application of the brakes, and operative to effect concurrent operation of both the fluid pressure brake system and the magnetic track brake system when effecting an emergency application of the brakes, and means responsive to the speed of the train and operative at a low predetermined speed for effecting a release operation of the magnetic track brake system only to effect a release of the magnetic track brakes.

9. In a vehicle brake system, in combination, a brake cylinder, a magnetic track brake device, control means operative when effecting a service application of the brakes for effecting a supply of fluid under pressure to said brake cylinder and operative when effecting an emergency application of the brakes for effecting a supply of fluid under pressure to said brake cylinder and the energization of said track brake device, a retardation controller device for controlling brake cylinder pressure, and speed controlled means for controlling the energization of said track brake device.

10. In a vehicle brake system, in combination, a brake cylinder, a magnetic track brake device, control means operative when effecting a service application of the brakes to effect a supply of fluid under pressure to said brake cylinder only, and operative when effecting an emergency application of the brakes to effect a supply of fluid under pressure to said brake cylinder and energization and lowering to a track rail of said track brake device, a retardation controller device for controlling brake cylinder pressure, and speed controlled means for controlling both the adjustment of said retardation controller device and the energization of said track brake device.

11. In a vehicle brake system, in combination, a fluid pressure brake system comprising a brake pipe, a magnetic track brake system, means for effecting an application of the magnetic track brake system, speed controlled means, and means controlled jointly by the speed controlled means and by the pressure in the brake pipe for controlling the duration of application of the magnetic track brake system.

12. In a vehicle brake system, in combination, a brake cylinder, a magnetic track brake device, a normally charged brake pipe, means operative upon a reduction of pressure in said brake pipe for effecting a supply of fluid under pressure to said brake cylinder and the energization of said track brake device, means operative to deenergize said track brake device at a low vehicle speed, and means controlled by brake pipe pressure for controlling said last means.

13. In a vehicle brake system, in combination, a brake cylinder, a magnetic track brake device, a brake pipe, means operative upon an emergency reduction in brake pipe pressure for effecting a supply of fluid under pressure to said brake cylinder and the energization of said track brake device, means operated according to the speed of the vehicle and operative at a low predetermined speed to deenergize said track brake device, and a switch device operated as a result of said reduction in brake pipe pressure for rendering said last means effective in controlling the deenergization of said track brake device.

14. In a vehicle brake system, a magnetic track brake device, means for effecting the energization of said magnetic track brake device to effect an application of the brakes, speed controlled means, means operative responsive to the operation of said speed controlled means and effective at a low vehicle speed to deenergize said track brake device, a normally charged brake pipe, and means operative only upon a reduction of pressure in said brake pipe at an emergency rate for rendering said deenergizing means effective.

15. In a vehicle brake system, in combination, a magnetic track brake device, a source of current supply, means for establishing a circuit from said source of supply to said magnetic track brake device, a switch device operative to open said circuit, a generator operative to produce a voltage proportional to the speed of the vehicle, means responsive to said voltage and operative when the voltage corresponds to a low vehicle speed for effecting the opening of said switch means, a normally charged brake pipe, and means including a pneumatic switch device operative upon a reduction in brake pipe pressure to render said last mentioned means effective.

16. In a vehicle brake system, in combination, an adjustable type retardation controller device operated according to the rate of retardation of the vehicle, said retardation controller device having contacts and being normally adjusted to limit the rate of retardation of the vehicle to a predetermined value, means controlled by said contacts for controlling the application of the brakes, speed controlled means, and means responsive to operation of said speed controlled means at a relatively low vehicle speed for adjusting the setting of said retardation controller device.

17. In a vehicle brake system, in combination, a retardation controller device operated according to the rate of retardation of the vehicle, means responsive to the operation of said retardation controller device for controlling the application of the brakes, an adjusting mechanism comprising an element subject to the pressure of fluid in a chamber for adjusting the response of said retardation controller device, a brake pipe, speed controlled means, and means controlled jointly by the pressure in said brake pipe and said speed controlled means for controlling the pressure of fluid in said chamber.

18. In a vehicle brake system, in combination, a retardation controller device operated according to the rate of retardation of the vehicle, means controlled by the retardation controller device for controlling the application of the brakes, an adjusting mechanism comprising a movable abutment subject to the pressure of fluid in a chamber for adjusting the response of said retardation controller device to the rate of retardation of the vehicle, a normally charged pipe, a device operated according to the speed of the vehicle, and means controlled jointly by the pressure of fluid in said pipe and the operation of said speed operated device for controlling the pressure of fluid in said chamber, and operable to vary the pressure in said chamber at a relatively low vehicle speed.

19. In a vehicle brake system, in combination, a brake cylinder, means for effecting a supply of fluid under pressure to said brake cylinder, a retardation controller device operated according to the rate of retardation of the vehicle, electro-responsive means responsive to the operation of said retardation controller device at a chosen rate of retardation for varying brake cylinder pressure, and means responsive to a predetermined brake cylinder pressure for modifying the action of said last mentioned means.

20. In a train brake system, in combination, a brake cylinder, a magnetic track brake device, means for effecting a supply of fluid under pressure to said brake cylinder and the energization of said track brake device, to effect an application of the brakes, a retardation controller device operated according to the rate of retardation of the vehicle, means responsive to the operation of said retardation controller device for varying brake cylinder pressure, to prevent the rate of retardation of the train produced by the application of the brakes from exceeding a predetermined value, means operative to deenergize said track brake device before fluid under pressure is released from said brake cylinder, said brake cylinder pressure being normally increased when said track brake device is deenergized so as to maintain a predetermined rate of retardation of the vehicle, and means operable so long as the brake cylinder pressure is above a predetermined value for preventing an increase in brake cylinder pressure upon deenergization of said track brake device.

21. In a vehicle brake system, in combination, a brake cylinder, means for effecting a supply of fluid under pressure to said brake cylinder, means including a retardation controller device for varying brake cylinder pressure to prevent the rate of retardation of the vehicle from exceeding a predetermined value, a brake pipe, and means controlled jointly by brake pipe pressure and the pressure of fluid in the brake cylinder for modifying the effectiveness of said last mentioned means.

22. In a vehicle brake system, in combination, a brake cylinder, means for effecting a supply of fluid under pressure to said brake cylinder, a retardation controller device operated according to the rate of retardation of the vehicle, an electrically operated valve device responsive to the operation of said retardation controller device for closing communication to the brake cylinder, a brake pipe, speed controlled means, and means controlled jointly by said speed controlled means and the pressure of fluid in both the brake pipe and the brake cylinder for also controlling the operation of said electrically operated valve device.

23. In a train or vehicle brake system, in combination, a fluid pressure brake system, a magnetic track brake system, a generator, an engine for driving said generator, means operative upon effecting an application of the fluid pressure brake system for supplying current to the magnetic track brake system from said generator, and means operative upon supplying current to the magnetic track brake system for controlling the speed of operation of said engine.

24. In a train or vehicle brake system, in combination, a fluid pressure brake system, a magnetic track brake system, a generator, an engine for driving said generator, means operative upon effecting an application of the fluid pressure brake system for establishing two independent circuits, means associated with one of said circuits for controlling supply of current from said generator to said magnetic track brake system, and means associated with the other of said circuits for controlling the speed of operation of said engine.

25. In a train or vehicle brake system, in combination, a fluid pressure brake system, a magnetic track brake system, a generator, an engine for driving said generator, means operative upon effecting an application of the fluid pressure brake system for establishing two independent circuits, means associated with one of said circuits for controlling supply of current from said generator to said magnetic track brake system, and means associated with the other of said circuits for controlling the speed of operation of said engine, and operable to reduce the speed of said engine, and consequently that of said generator, before terminating the supply of electric current to said magnetic track brake system.

26. In a train or vehicle brake system, in combination, a fluid pressure brake system, a magnetic track brake system, a generator, an engine for driving said generator, means operative upon effecting an application of the fluid pressure brake system for supplying current to the magnetic track brake system from said generator, a positionable control element for controlling the speed of said engine and hence the output of said generator, and means for correlating the position of said control element with supply of current to said magnetic track brake system.

ELLIS E. HEWITT.